Aug. 11, 1936.  J. S. TRITTON  2,050,770
LAMP CONTROL FOR VEHICLES
Filed May 11, 1933   2 Sheets-Sheet 1
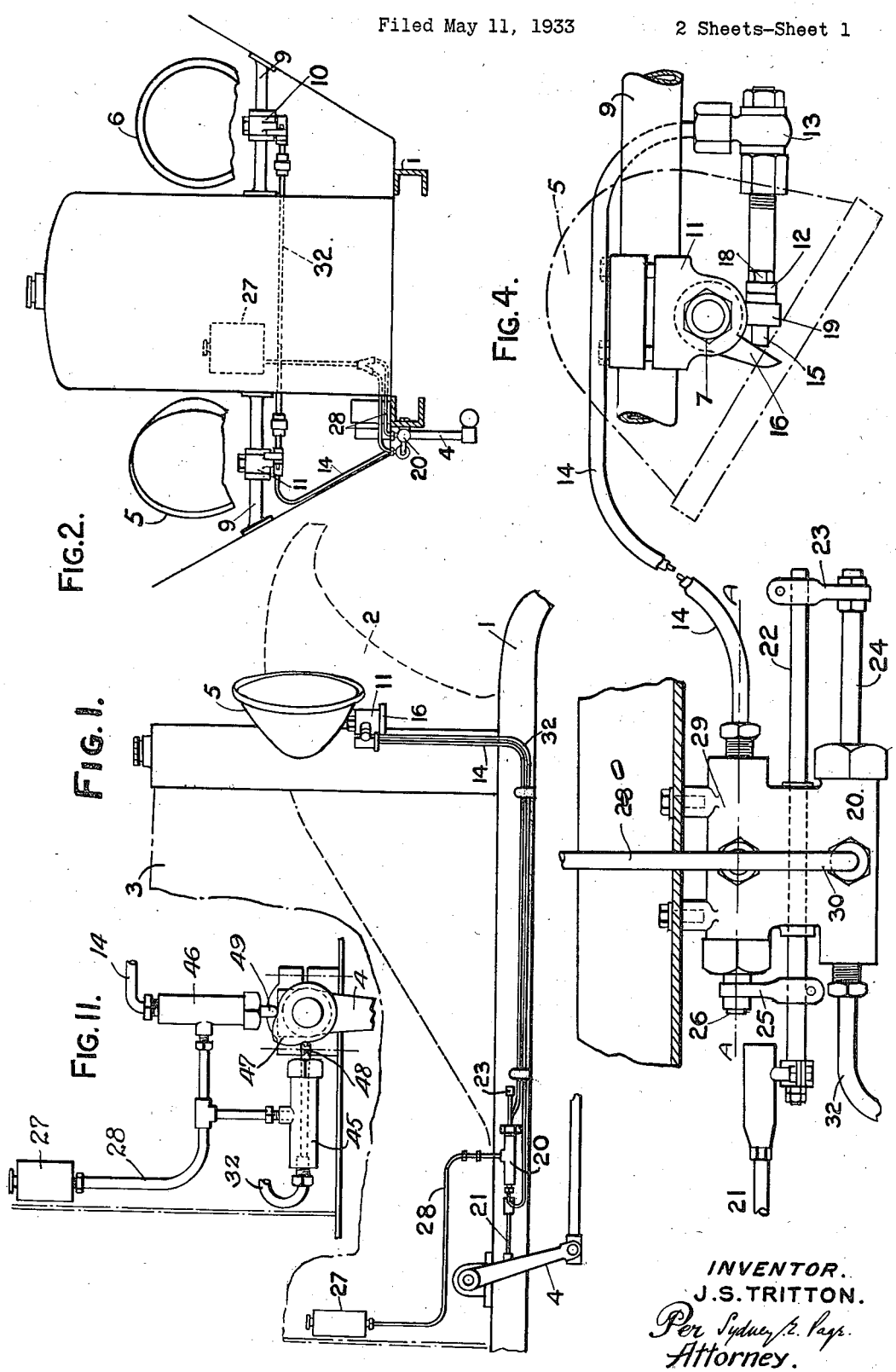
INVENTOR.
J. S. TRITTON.
Per Sydney E. Page.
Attorney.

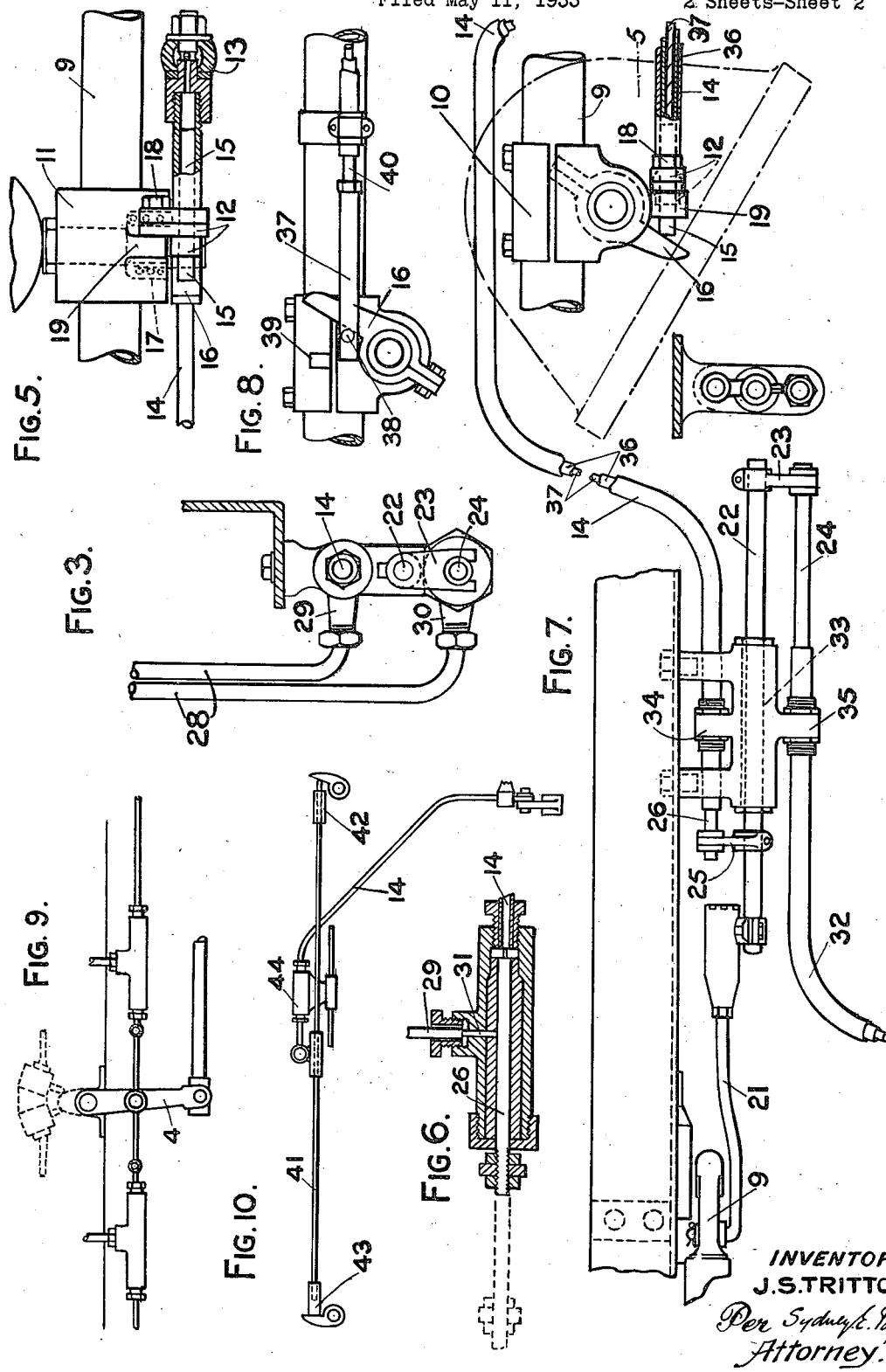

Patented Aug. 11, 1936

2,050,770

UNITED STATES PATENT OFFICE 2,050,770

LAMP CONTROL FOR VEHICLES

Julian Seymour Tritton, Surbiton Hill, England

Application May 11, 1933, Serial No. 670,533
In Great Britain May 25, 1932

5 Claims. (Cl. 240—62.3)

This invention relates to means for controlling the movement of a pair of lamps on vehicles where one lamp at a time is partially rotated either by hand, or preferably by connection to the steering gear of the vehicle, the object being to give more effective illumination of the roadway when turning corners, or for operation in fogs, or otherwise.

It has heretofore been proposed to connect a pair of lamps on a motor vehicle with the steering gear so that steering in one direction turns one lamp in the direction of passage, while not affecting the rotation of the opposite lamp. An example of such an invention is shown in my United States patent specification No. 1,887,074.

The present invention has reference to a construction which should be more easily fitted to motor vehicles of different design as concerns the lamp supports and steering gear, with greater freedom from vibration of the lamps and mechanism.

It should be understood that although mainly applicable to motor vehicles the invention is also applicable to other vehicles with a turning movement for the steering apparatus from which a movement can be originated.

In lamp swivelling apparatus it has heretofore been proposed to employ an arm on a lamp spindle carried in a bearing and pressed against a fixed stop by a spring in one direction being freely engaged by a guided rod which imparts movement to it in the other direction, and this invention comprises means in the form of a tubular casing connected with the guide member, from which the guided rod projects adjacent to the arm, and a medium within the said casing operated from a steering point to cause the projection of the rod from the casing, and its withdrawal to allow the return of the lamp to straight forward position. The purpose of the tubular casing is so that the apparatus can be applied to various makes of vehicle by reason of its capacity to follow a straight, curved, or angular path which suits the contour of the vehicle.

Means by which the motion of the steering point is conveyed to the lamp rod comprise a starting member, for example, a cylinder from which a tubular casing is led to the vicinity of the lamp where the lamp rod operates due to the motion conveyed from the starting member to the lamp rod by a medium within the tubular casing; this may either be a liquid worked upon a hydraulic system, or it may be a flexible transmission device of mechanical character, such, for example, as a flexible push and pull cable of which there are forms already known.

According to this invention—say—as applied to a pair of lamps on a motor vehicle, one lamp may remain stationary while the other is turned, and the motion of the turning lamp will be of a harmonic character, that is, rotary movement at the commencement will be rapid, and will decrease as the limit of turning movement is reached.

The accompanying drawings illustrate preferred forms of the invention:—

Fig. 1 is a side elevation showing the invention applied to a motor car lamp, the bonnet and wing shown dotted;

Fig. 2 is a front elevation showing the tubular casing connected with both lamps;

Fig. 3 is an end view of the cylinders of the hydraulic transmission;

Fig. 4 is a plan view of the actuating cylinders for the tubular transmission;

Fig. 5 is a detail view showing the construction of a terminal socket or cylinder with the lamp rod;

Fig. 6 is a section on the line A—A of Fig. 4;

Fig. 7 illustrates the invention adapted for a flexible cable working in the tubular casing;

Fig. 8 illustrates a variation when the lamp rod operates by means of a pull;

Fig. 9 illustrates diagrammatically another arrangement of the tubular casing in reference to a drop arm;

Fig. 10 illustrates diagrammatically another arrangement of the invention with regard to the lamp rods; and Fig. 11 illustrates a modification operated by a cam on the drop arm.

Referring to Figs. 1 to 5 of the drawings, I represents the chassis frame of a motor vehicle, the wing 2 and bonnet 3 thereof being shown dotted; 4 is the drop arm of the steering mechanism and 5, 6 are lamps supported in approximately the normal position, except that in this case they are carried by spindles, such as 7, which rotate in the bearings 10, 11 attached to a stationary member of the vehicle, for example, cross bars such as 9; carried by a lug 19 on the bearing 11 is a terminal socket or cylinder 12 attached to the end of the tubular casing 14 through the elbow joint 13, the lamp rod or plunger 15 projecting from this socket 12, as will be seen from Fig. 4 opposite the lamp arm 16 which rotates the spindle 7 and therewith the lamp 5.

As will be seen the rod 15 is retracted below the level of the end of the socket 12 when the lamp arm is in normal position, this position being reached by the action of the coil spring 17 and suction or negative pressure on the medium in the casing 14.

Referring now to the cylinder member 20, the connecting rod 21 connected to the drop arm 4 (it may connect with some other point in the steering mechanism) operates a transmission rod 22, guided suitably by the casing 20 and connected at one end 23 to the plunger 24 and at the opposite end 25 to the other plunger 26 (within the cylinder). Liquid is supplied to the cylinder 20 from a header tank 27 led thereto by the pipes 28 through two branches 29 and 30.

The connection of the branches 29, 30 (see Fig. 6) is through a pair of small ports of which one is shown in section at 31, Fig. 6. In operation movement of the drop arm 4 operated by the steering wheel transmits motion through the connecting rod 21 to the rod 22, and thereby through the cross head 25 to the plunger 26 (see Fig. 6), causing a pressure in the liquid in the tubular casing 14 to be transmitted to the lamp rod 15 which thereupon is projected from the socket 12 and swivels the lamp 5 by means of the arm 16.

By fixing the socket 12 to the bracket 19 by a radius piece and screw, such as 18, an adjustment may be made by means of a radius swing so as to vary the movement applied to the arm 16. Movement of the socket 12 towards the spindle shortens the leverage, the arm 16 being made wide enough to accommodate this adjustment. As will be seen the leverage of the rod 15 on the arm 16 increases as the stroke proceeds, with consequent decrease in the rate of angular movement of the lamp.

While this swivelling action, or a part of it is taking place the opposite lamp is held stationary.

Upon the return of the drop arm 4 to straight forward position the plunger 26 is retracted producing a suction within the tube 14 which assists the spring 17 of the lamp spindle in causing the return of the arm 16 to normal position. Since the further movement of the plunger 26 is necessary when the plunger 24 is operating, liquid can enter the cylinder through the port 31 drawing its supply from the tank 27 and further suction on the pipe 24 is therefore, relieved.

Precisely the same action takes place when the drop arm 4 moves to the left, the transmission being then accomplished by means of the plunger 24 operating through the tube 32 and turning the lamp 6, the lamp 5 remaining stationary.

The invention might be operated by two separate cylinders each having a plunger actuated by the steering mechanism, for example, as shown in Fig. 9, and each connected by a tubular casing with one of the lamp sockets. Alternatively, the plungers might be operated by cams, either on the boss of the drop arm, or connected therewith, for example, as shown in Fig. 11: In this figure tubular casings 14 and 32 lead as before to operating plungers 15 adjacent the lamps. The operation of these plungers is effected by the actuating plungers 49, 48 actuated by the cam 47 on the drop arm 4; the plungers 49, 48 work in actuating cylinders 45, 46 respectively, which are connected as before with a header tank 27 through the connecting pipes 28. Movement of the drop arm 4 by the steering wheel, therefore, actuates either the plunger 49 or the plunger 48 to turn a lamp by transmission of the movement by means of the liquid in the tubular system operating one or other of the plungers 15.

Fig. 10 illustrates diagrammatically another form in which the invention may be arranged, 41 being a rod extending across the front of a vehicle from a guide on one side 42 to a guide on the other side 43, and being operated from a central point such as 44 in substantially the same way as before, the tubular casing 14 being carried along any convenient path to the vicinity of the drop arm, or other steering point on the vehicle. The transmission medium in the tubular casing 14 in this case would be a push and pull cable.

In the case where the transmitting medium within the tube is a liquid, it may be oil supplied from the tank 27, and the lamp spindles such as 7 may be either long or short with the arm, such as 16, at any convenient angle or distance from the lamp to suit the arrangement of the tubes on any given vehicle.

Referring to Fig. 7 which corresponds with Fig. 4, 33 is a terminal frame, the tubular casing 14 being secured by the bracket 34 and the tubular casing 32 being secured by the bracket 35; the transmission rod 22 will be operated as before by connection to the drop arm 4 by the connecting rod 21, and the action is precisely the same except that the plunger ends 24, 26 are attached directly each to one end of the flexible push and pull cable in the tubes 14, 32.

The construction of such a cable is shown on the right-hand side of Fig. 7, where the lamp rod 15 is shown extending somewhat within the casing 14, and moves along with the push part of the casing 36 which may be in the form of a coiled sheath covering the pull, or tension part of the cable 37.

In operation the lamp arm 16 comes to rest against the socket terminal 12 (shown dotted). Consequently, when movement is imparted to the plunger 26, say towards the right, the guided lamp rod 15 will be pressed out from the socket 12. At the same time it will be noticed that the plunger end 24 has also been moved and referring to the corresponding socket on the opposite lamp it will be found that there the corresponding lamp rod 15 is retracted below the level of the terminal 12 so as to be well within the casing, this lost motion leaving the lamp arm 16 stationary against the abutment formed by the end of the socket 12.

Referring to Fig. 8 which is a view from underneath, the invention may be applied to the lamp arm by pulling, this being achieved by means of the stirrup piece 37 pulling against the lamp arm 16 by its pin 38, lost motion being allowed for by reason of the long space in the stirrup 37 which allows of the arm 16 being returned by its spring against the abutment 39, while the travel of the cable end 40 continues beyond the abutment point.

An advantage of this invention is that due to the shortness of any connecting rods, or plungers, there is a considerable reduction of vibration as compared with mechanism operated wholly by mechanical rods, and levers, thus increasing steadiness of the lamps, when running.

It should be understood that though described herein as swivelling the lamp, the term "lamp" is intended to cover either the lamp casing, or the lamp reflector.

It should be understood that some variations of the construction may be carried out without departing from the spirit and scope of this invention.

Thus it will be seen that direct mechanical operation may take place between the lamps with a preliminary transmission thereto by tubular casing, or vice versa a direct mechanical operation may take place from the steering point to the distributing point, or the tubular casing may directly transmit the whole movement, or by a division of the transmission into two stages.

What I claim is:—

1. An operating mechanism for dirigible head lamps, including a pair of hydraulic power cylinders, a single acting plunger operative in each of said hydraulic power cylinders, a pair of hydraulic operating cylinders, a single acting plunger in each of said hydraulic operating cylinders, a communication between one of the power cylinders and one of the operating cylinders adjacent one lamp, a communication between the other of said power cylinders and the other of said operating cylinders adjacent the other lamp, a tank for the operating fluid, a communication between each power cylinder and the tank, said communication being open when the lamp with which that power cylinder cooperates is directed longitudinally of the vehicle, a reversely movable element on the steering mechanism of the vehicle acting in movement in one direction to compel power movement of the plunger in one of the power cylinders and in movement in the opposite direction to compel power movement of the plunger of the other power cylinder, the power movement of a plunger of the power cylinder compelling operative movement of the plunger of the connected operating cylinder, and means including a projecting arm at each lamp mounting actuated by the operated plunger of an operating cylinder to turn the lamp with which said plunger is associated.

2. A construction as defined in claim 1, including means for adjusting each operating cylinder and thereby the plunger therein to vary the operative effect of the plunger on said arm.

3. A construction as defined in claim 1, wherein communication between a power cylinder and an operating cylinder is uninterrupted to utilize the non-power stroke of the plunger of a power cylinder for the creation of suction in the connected operating cylinder to assist the withdrawal of the operated plunger therein, and an auxiliary spring for the return of the plunger.

4. An operating means for a dirigible lamp mounting, including a bracket, a lamp support rotatable in the bracket, a coiled spring to return the lamp support to normal, an arm on the lamp support, an abutment on the bracket to be engaged by the arm when the lamp is in straight-ahead position, an operating cylinder open to a source of fluid under pressure, a plunger in said cylinder responsive to the fluid under pressure to engage and operate the arm for turning the lamp in one direction, and means for supporting the operating cylinder with respect to the bracket, said means being adjustable to vary the leverage effect of the plunger on the arm.

5. An operating means for a dirigible lamp mounting including a bracket, a lamp support rotatable in the bracket, a coiled spring to return the lamp support to normal, an arm on the lamp support, an abutment on the bracket to be engaged by the arm when the lamp is in straight-ahead position, an operating cylinder open to a source of fluid under pressure, a plunger in said cylinder responsive to the fluid under pressure to engage and operate the arm for turning the lamp in one direction, and means for supporting the operating cylinder with respect to the bracket, said means including a radius piece connected to the cylinder and a screw for adjustably connecting said radius piece to the bracket, whereby the radius piece may be adjusted to vary the leverage effect of the plunger on the arm.

JULIAN SEYMOUR TRITTON.